United States Patent [19]
Jansen

[11] Patent Number: 6,025,409
[45] Date of Patent: Feb. 15, 2000

[54] RADIATION CURABLE COATING COMPOSITION

[75] Inventor: Johan F. G. A. Jansen, Geleen, Netherlands

[73] Assignee: DSM N.V., Heerlen, Netherlands

[21] Appl. No.: 09/143,528

[22] Filed: Aug. 28, 1998

Related U.S. Application Data

[63] Continuation of application No. PCT/NL97/00017, Jan. 20, 1997.
[60] Provisional application No. 60/012,685, Mar. 1, 1996.

[30] Foreign Application Priority Data

Feb. 29, 1996 [EP] European Pat. Off. .............. 96200526

[51] Int. Cl.$^7$ ................ C08F 2/46; C08F 2/48; C08F 216/12; C08F 222/06
[52] U.S. Cl. ............ 522/107; 522/104; 522/167; 522/168; 522/178; 522/180; 522/186; 522/188; 522/913
[58] Field of Search .................. 522/107, 104, 522/167, 168, 178, 180, 186, 188, 913; 430/58, 56

[56] References Cited

U.S. PATENT DOCUMENTS 5,446,073  8/1995  Jonsson et al. .................. 522/104
5,536,760  7/1996  Friedlander et al. ............ 522/96

FOREIGN PATENT DOCUMENTS 618 237    5/1994   European Pat. Off. .
90/10660   9/1990   WIPO .
90/10662   9/1990   WIPO .
92/02572   2/1992   WIPO .
92/14764   9/1992   WIPO .
96/01283   1/1996   WIPO .

OTHER PUBLICATIONS

Derwent Abstract, 04328791 [JP 5320491], Inventors Tomioka Kan et al., "Unsaturated Polyester Resin Composition ," Assignee, Dainippon Ink and Chem KK (DNIN), Dec. 1993.

Derwent Abstract, 009732664 [JP 5320491], Inventors Tomioka Kan et al., "Unsaturated Polyester Resin Composition," Assignee, Dainippon Ink and Chem KK (DNIN), Dec. 1993.

*Primary Examiner*—James J. Seidleck
*Assistant Examiner*—Sanza L. McClendon
*Attorney, Agent, or Firm*—Pillsbury Madison & Sutro

[57] ABSTRACT

The invention relates to a coating composition comprising (a) a radiation-curable binder composition comprising an unsaturated compound having at least one maleate, fumerate, itaconate, citraconate or mesaconate group; (b) an unsaturated vinylether compound and a compound which forms a strong exciplex with (a) or (b); that is otherwise free of a photoinitiating compound.

16 Claims, No Drawings

RADIATION CURABLE COATING COMPOSITION

This application claims the benefit of U.S. Provisional Application No. 60/012,685, filed Mar. 1, 1996.

This a continuation of: International Appln. No. PCT/NL97/00017 filed Jan. 20, 1997 which designated the U.S.

The invention relates to a coating composition comprising a radiation curable binder composition comprising a) an unsaturated compound comprising at least one maleate, fumarate, itaconate, citraconate or mesaconate groups, and b) an unsaturated compound comprising at least one vinylether group.

Such a composition is known from EP-A-618237. According to EP-A-618237, such a composition can be cured with suitable UV light without the use of any photoinitiator. However, the curing rate of such a composition appears to be relatively slow in comparison with a composition including a photoinitiator.

The use of common photoinitiators has the disadvantage that residues of these photoinitiators may migrate out of the coating after cure. This is disadvantageous because these migrated residues cause contamination of the environment. Therefore, such coatings are not suitable for products with direct food contact.

An object of the present invention is to provide coating compositions comprising binder composition comprising compounds a) and b), that cure fastly, and yet do not comprise photoinitiators that leave unwanted residues.

It has been found pursuant to the present invention, that fast curing compositions can be obtained if the composition contains less than 15 wt. % (relative to a)+b)) of a compound having an ethylenic unsaturation and having an electron donating group stronger than a vinyl ether group, which forms a strong exciplex with a) or a compound having an ethylenic unsaturation and having an electron withdrawing group, stronger than a maleate group, which forms a strong exciplex with b). The exciplex functions as a photoinitiator, and the composition is free of any other photoinitiating compound.

Unexpectedly, the use of such a small amount of a compound which forms a strong exciplex with a) or b) is sufficient to achieve a curing rate that is comparable to the rate observed when a common photoinitiator is used. This is unexpected in particular, if one observes that compositions according to EP-A-618237 containing polyacrylates that are combined with exciplex forming compounds, do not show a curing rate that is comparable with the curing rate of acrylates with common photoinitiators.

By preference, the compound which forms a strong exciplex with a) is selected from one or more compounds from the group consisting of N-vinyl carbazole derivatives, iso-eugenol derivatives, substituted styrene derivatives and N-vinyl pyrrolidone derivatives. Particular examples of such compounds are N-vinyl carbazole, iso-eugenol-acetate, methoxy-ethoxy-iso-eugenol, N-vinylpyrrolidone, p-methoxystyrene, isoamyloxystyrene, (m)ethylthiostyrene, p-N,N-dialkylaminostyrene, 2-chloro-ethoxystyrene and the like.

A compound having an ethylenic unsaturation and having an electron withdrawing group, stronger than a maleate group, which forms a strong exciplex with b).

More particularly the compound which forms a strong exciplex with b) is selected from one or more compounds from the group consisting of N-alkyl maleimides, mono- and dicyanofumarates, maleic acid anhydride, fumaronitril, fumaric and maleic mono and diamide derivatives. Particular examples of such compounds are N-phenyl-maleimide, N-2-ethylhexylmaleimide, N-cyclohexyl-maleimide, fumaronitril, fumaramide, dicyanofumarate diethylester, the dibutylester of monocyano fumarate, maleic acid anhydride, the di-butylamide of fumaric acid, maleic acid di(ethylamide) and the i-propylester of maleic acid octylamide.

The amount of the compound which forms a strong exciplex with a) or b) can be adjusted by the person skilled in the art, and is preferably a small but effective amount as to achieve a good cure. In general, the amount will be less than 15 wt. %, and preferably is less than 10 wt. %. In general, the amount will be larger than 0.1 wt. %, and is often larger than 0.5 wt. %. The wt. % is the amount used relative to compounds a) and b).

The compound which forms a strong exciplex with a) or b) can also be attached to or incorporated in an oligomer or a polymer. Exemplary polymers are saturated and unsaturated polyesters, polyacrylates, polyethers, polyurethanes, and polyolefins.

Preferably, the compound which forms a strong exciplex having an electron donating group stronger than a vinyl ether group is attached to or incorporated in a oligomer or a polymer containing at least one vinyl ether group.

In another preferred embodiment the compound which forms a strong exciplesx with b) having an electron withdrawing group stronger than a maleate group is attached to or is incorporated in a polymer or an oligomer comprising at least one maleate, fumarate, itaconate, citraconate or mesaconate group.

The radiation- curable binder composition is substantially based on a) an unsaturated compound comprising at least one maleate, fumarate, itaconate, citraconate or mesaconate group and b) an unsaturated compound comprising at least one vinylether group.

Preferably the unsaturated compound comprising at least one maleate, fumarate, itaconate citraconate or mesaconate group is an unsaturated polyester, an oligomer or a monomer.

Preferably, the unsaturated compound a) comprises at least one maleate or fumarate group.

As an unsaturated polyester, ordinary unsaturated polyesters can be used, with a molecular weight (Mn) of 800–5000. These polyesters generally are based on one or more diacids and one or more diols, the diacids are at least in part ethylenically unsaturated diacids.

Suitable diacids include, for example, maleic acid (anhydride), fumaric acid, itaconic acid (anhydride), citraconic acid (anhydride) mesaconic acid, phthalic acid (anhydride) adipic acid, terephthalic acid, isophthalic acid, malonic acid, succinic acid, glutaric acid, sebacic acid, and 1,4-cyclohexane dicarboxylic acid and, if possible, the Diels-Alder products thereof.

Suitable diols include, for example, ethyleneglycol, butanediol, neopentylglycol, hexanediol, 1,4-cyclohexane diol, 1,4-cyclohexanedimethanol, propyleneglycol, diethylene glycol, alkoxylated bisphenol-A, and alkoxylated hydrogenated bisphenol-A.

The diacids and diols may be combined with mono-, tri- or tetra-functional alcohols or acids. Suitable compounds are, for example, ethanol, butanol, 2-ethylhexanol, saturated and unsaturated fatty acids, trimellitic acid, trimethoylolpropane, glycerol, pentaerythritol and the like.

The amount of unsaturation of the unsaturated compound generally is given as the molecular weight per double bond, (WPU), and is generally between 150–2000. Preferably, the molecular weight per double bond is 180–1500.

Apart from, or in combination with unsaturated polyesters, this unsaturated compound may be an oligomer or a monomer. Preferably a maleate of fumarate end-capped oligomer is used with one or more unsaturated groups. Also, monomeric species such as for example dioctylmaleate can be used. Further suitable maleate or fumarate functional compounds are described in EP-A-462204 and EP-A-462183, the complete disclosures of which are incorporated herein by reference. Thus, this type of unsaturated compound in general will have a molecular weight (Mn) higher than 140, preferably higher than 200, and will have a molecular weight lower than 5000, preferably lower than 3000. The number of unsaturations per molecule generally will, on average, be between 1 and 10. Preferably, the number of unsaturations is between 1–5.

In one preferred embodiment of the invention, an oligomer is used with a molecular weight between 200–1500, which comprises 2–4 unsaturated groups per molecule.

In a further preferred embodiment of the invention, a monomer is used with 1–3 unsaturations per molecule, to adjust the viscosity of the coating compostion.

Preferably, the unsaturated compound comprising at least one vinylether group is a vinylether group comprising polymer, oligomer or monomer, the polymer, oligomer or monomer having 1–10 vinylether groups.

The molecular weight (Mn) of the vinylether compound is in general higher than 90, preferably higher than 100. In general, the molecular weight is lower than 5000, preferably lower than 3000.

Examples of suitable vinylether comprising compounds are described in EP-A-462204 and EP-A-462183, the complete disclosures of which are incorporated herein by reference. Suitable examples of mono- and divinylether compounds include butylvinylether, cyclohexyldi- methanoldivinylether, butyldivinylether, riethyleneglycol-divinylether, and hydroxybutylvinylether.

Very suitable oligomers and polymers are polyurethanes having a polyester, polyether or polycarbonate backbone and vinylether end groups, made by reaction of a hydroxyalkylvinylether, a polyisocyanate and a hydroxy-functional oligomer. This oligomer being a polyester, polyether or polycarbonate with a molecular weight between 200 and 2000.

The unsaturated compound comprising at least one maleate, fumarate, itaconate, citraconate or mesaconate group and the unsaturated compound comprising at least one vinylether group can also be combined in one molecule. For instance, a vinylether end-capped polyurethane can be used, which has as an hydroxyfunctional unsaturated polyester as a backbone. Further, dual functional monomers as described in EP-A-462204 are suitable as well.

Preferably, the ratio of double bonds of compounds having ethylenic unsaturation and electron donating groups and compounds having ethylenic unsaturation and electron withdrawing groups is, on molar basis, between about 0.8:1.2 and 1.2:0.8, and is more in particular about 1:1.

Unexpectedly fast curing coating compositions are obtained also, if up to 70 mol % of the vinylether unsaturation is replaced by allyl unsaturated compounds. Preferably, up to 50 mol % of the vinylether unsaturation is replaced by compounds having allyl groups. Suitable compounds having allyl unsaturation are for example triallylcyanurate, triallylisocyanurate, diallylphthalate and the like.

The coating composition comprising the radiation curable binder composition may further comprise suitable pigments and additives. The coating composition may be solvent based, but is preferably solvent free. The coating may be applied as a water based coating, a solvent based coating, a high solids or 100% solids coating or a powder coating.

Pursuant to the present invention, the compositions are subjected to irradiation, e.g. preferably Electron Beam (EB) or ultraviolet light to cause polymerization of the coating composition. Ultraviolet light is preferably high intensity light to provide a dosage of at least about 0.2 joules per square centimeter of surface area of the composition being polymerized to achieve reasonable curing rates. In the event that lower energy light is to be employed, it may then be desired to subject the compositions also to elevated temperatures in order to reduce the time for adequate polymerization to occur.

In addition, the ultraviolet light applied in for example vinylether-maleimide systems typically can have substantial magnitudes at wavelengths of at least about 310 nanometers. Suitable lamps employed to provide the desired high intensity and availability of wavelength and spectral distribution include, for example, an eximer lamp (see pages 48–52 of the Conference Proceedings of the Rad Tech Europe 95) and a lamp that is available from Fusion Systems, Corp. under the trade designation F-450 model with a D bulb. At typical band speeds of about 6 to about 30 meter per minute such gives a peak irradiance of about 1 to about 2.6 watt/cm$^2$ of the surface area of the composition. A lamp can be choosen depending on the absorbing wavelength of the exciplex.

The coating compositions comprising the radiation curable binder composition of the present invention are suitable for many applications such as for example coatings on plastic, paper, leather and wood, can coatings and in particular interior can coatings.

The invention will be further elucidated by the following non-limiting examples.

Examples I–III and Comparative Experiments A and B

A mixture was prepared of 6 g unsaturated polyester (Uralac XP 3125 of DSM Resins), having a molecular weight per double bond of about 1000, and 0.61 g triethyleneglycol divinylether. This mixture was dissolved in 6 ml tetrahydrofuran. For the comparative experiments A and B respectively no further compound was added (A), and 2 wt. % photoinitiator Irgacure 184® (B). For Examples I–III respectively 2, 5 and 10 wt. % of cyclohexylmaleimide was added. These compositions were applied on a substrate (150 μm on an alumina Q panel) and the solvent was evaporated overnight. The coatings were cured under a mercury UV-lamp with a peak intensity of 0.3 Watt/cm$^2$ and a dose of 2 J/cm$^2$. The cure was monitored by means of a König pendulum hardness measurement according to DIN 53 157 (ISO 1522). Results are summarized in Table 1.

TABLE 1

|  | Example | | | Experiment | |
| --- | --- | --- | --- | --- | --- |
|  | I | II | III | A | B |
| cure time (sec) | 30 | 8 | 7 | 90 | 7 |

These examples, show that a composition according to EP-A-618237 cures relatively slow. The cure speed can be substantially improved by using an exciplex forming compound according to the invention. Using 5 wt. % of cyclohexylmaleimide compound, results in virtually the same cure speed which has been reached when 2 wt. % of a common photoinitiator such as Irgacure® 184 is used.

Comparative Experiments C–D

A composition was made by mixing 2 g trimethylolpropanetriacrylate with 5 wt. % charge-transfer complex consisting of 0.064 g cyclohexyl-maleimid and 0.036 g triethyleneglycoldivinylether (Experiment C), and with 2 wt. % of Irgacure 184® (Experiment D).

The cure speed of a 150 μm film of the composition of Experiment C was a factor of 10 lower than the cure speed of composition D (i.e. 32 sec. versus 2–3 sec.). Furthermore, the coating of composition C exhibited some surface inhibition, i.e. the film was not completely cured on the surface.

Examples IV–VII

Employing the same method as described in Example I, compositions were prepared with 1.01 g triethyleneglycoldivinylether, 10 g unsaturated polyester (Uralac XP 3125) in 11 ml THF and further were made, and the irradiation time necessary to achieve good cure is also given in this Table.

TABLE 2

|  | Example | | | |
| --- | --- | --- | --- | --- |
|  | IV | V | VI | VII |
| initator | fumaro nitril | acetoxy styrene | N-vinyl- pyrolidone | fumaramide 0.1 g[1)] |
| amount | 0.5 g | 0.5 g | 0.5 g |  |
| irradiation time to cure (sec) | 18 | 25 | 15 | 10 |

[1)]as not all fumaramide dissolved in the coating, the actual effective amount will have been somewhat less than 1 wt. %

These examples show that a large variety of compounds can be used to form an exciplex. The irradiation time necessary to achieve full cure is slightly longer in Examples IV–VI, probably because the UV-spectrum of the UV-lamp does not match as good as in e.g. Examples II and VII. With a UV-lamp that is adapted to the absorption spectrum of the exciplex, a faster cure can be achieved in examples IV–VI.

Example VIII

Employing the method as described in Example I, a composition was made based on 0.42 g triallylcyanurate, 0.55 g triethyleneglycoldivinylether, 10 g unsaturated polyester (Uralac XP 3125), and 0.42 g (4 wt. %) cyclohexylmaleimide in 11 ml THF. The coating was cured after only 8 sec. of irradiation. Thus, part of the vinyl ether functional compound can be replaced by allyl functional compounds.

I claim:

1. A coating composition comprising a radiation curable binder composition comprising:
   a) an unsaturated compound comprising at least one maleate, fumarate, itaconate, citraconate or mesaconate group, and
   b) an unsaturated compound comprising at least one vinylether group wherein the composition contains, relative to the total weight of a) and b), less than 15 wt. % of
      a compound having ethylenic unsaturation and an electron donating group, stronger than a vinylether group, which forms a strong exciplex with a) or
      a compound having ethylenic unsaturation and an electron withdrawing group, stronger than a maleate groups which forms a strong exciplex with b)
   as a photoinitiator,
   said composition being free of any other photoinitiating compound.

2. A coating composition according to claim 1, wherein the compound which forms a strong exciplex with a) is selected from one or more compounds from the group consisting of N-vinylcarbazole derivatives, isoeugenol derivatives, substituted styrene derivatives and N-vinylpyrolidone derivatives.

3. A coating composition according to claim 1, wherein the compound which forms a strong exciplex with b) is selected from one or more compounds from the group consisting of N-alkylmaleimides, mono- and dicyanofumarates, maleic acid anhydride, fumaronitril, fumaramide, and fumaric and maleic mono and diamide derivatives.

4. A coating composition according to any one of claims 1–3, wherein the unsaturated compound comprising at least one maleate, fumarate, itaconate, citraconate or mesaconate group is an unsaturated polyester, an oligomer or a monomer.

5. A coating composition according to claim 1, wherein the unsaturated compound comprising at least one vinylether group has 1 to 10 vinyl ether groups and is a polymer, oligomer or monomer.

6. A coating composition according to claim 1, wherein the ratio of double bonds of compounds having ethylenic unsaturation and an electron donating group and compounds having ethylenic unsaturation and an electron withdrawing group is between 0.8:1.2 and 1.2:0.8.

7. A coating composition according to claim 1 wherein the compound which forms a strong exciplex is attached to or incorporated in an oligomer or a polymer.

8. A coating composition according to claim 1, wherein up to 70 mol % of the compounds having vinylether double bond is replaced by compounds having allyl double bonds.

9. A coating obtained by curing a composition according to claim 1.

10. A coating obtained by curing a composition according to claim 2.

11. A coating obtained by curing a composition according to claim 3.

12. A coating obtained by curing a composition according to claim 4.

13. A coating obtained by curing a composition according to claim 5.

14. A coating obtained by curing a composition according to claim 6.

15. A coating obtained by curing a composition according to claim 7.

16. A coating obtained by curing a composition according to claim 8.

* * * * *